Sept. 12, 1939.　　　　W. D. GROW　　　　2,172,472
FISH-SCALING MACHINE
Filed Jan. 18, 1936　　　4 Sheets-Sheet 1

INVENTOR
Walter D. Grow
BY Albert E. Field
his ATTORNEY

Sept. 12, 1939.  W. D. GROW  2,172,472
FISH-SCALING MACHINE
Filed Jan. 18, 1936  4 Sheets-Sheet 2
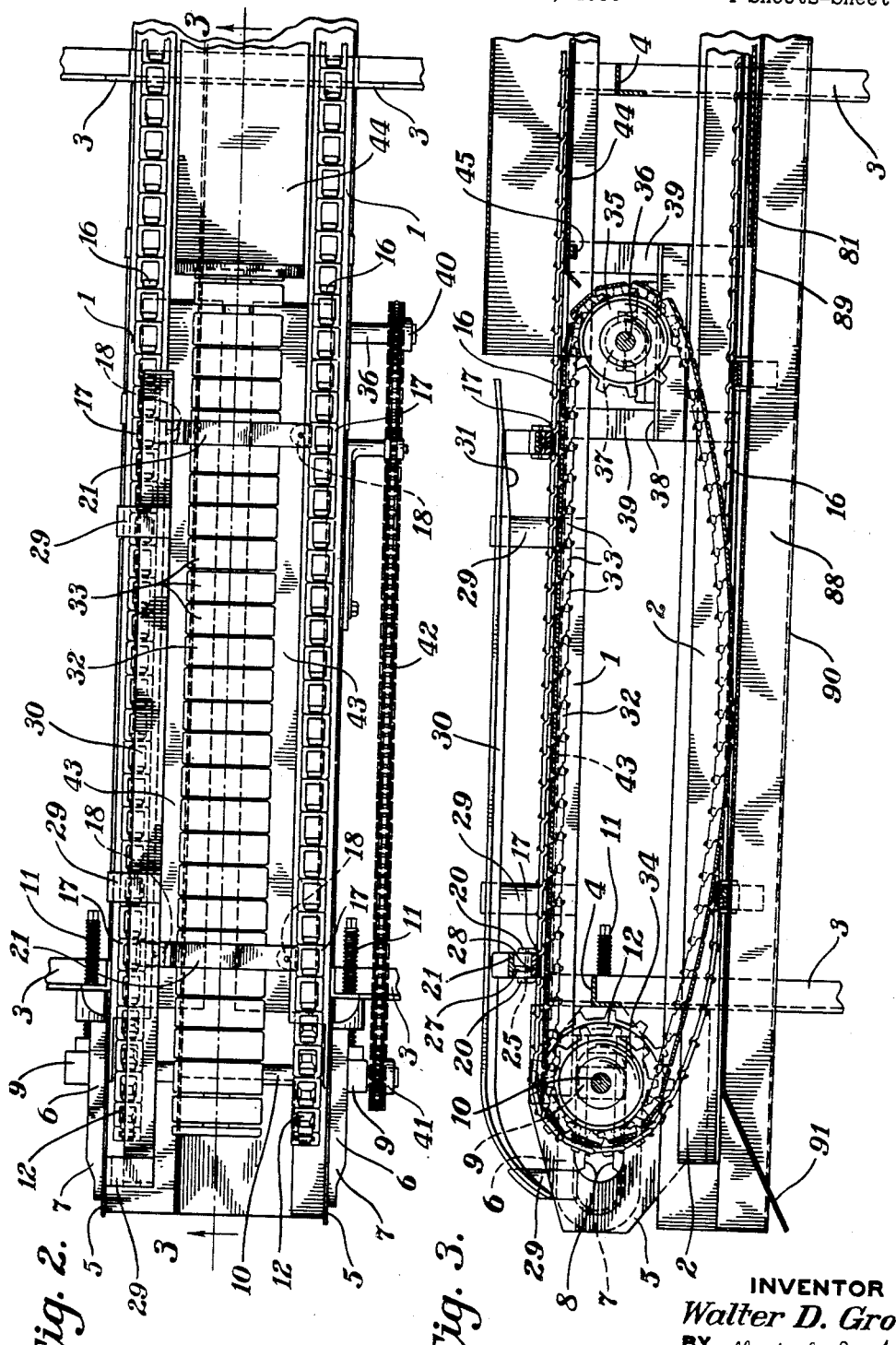
INVENTOR
Walter D. Grow
BY Albert E. Field
his ATTORNEY

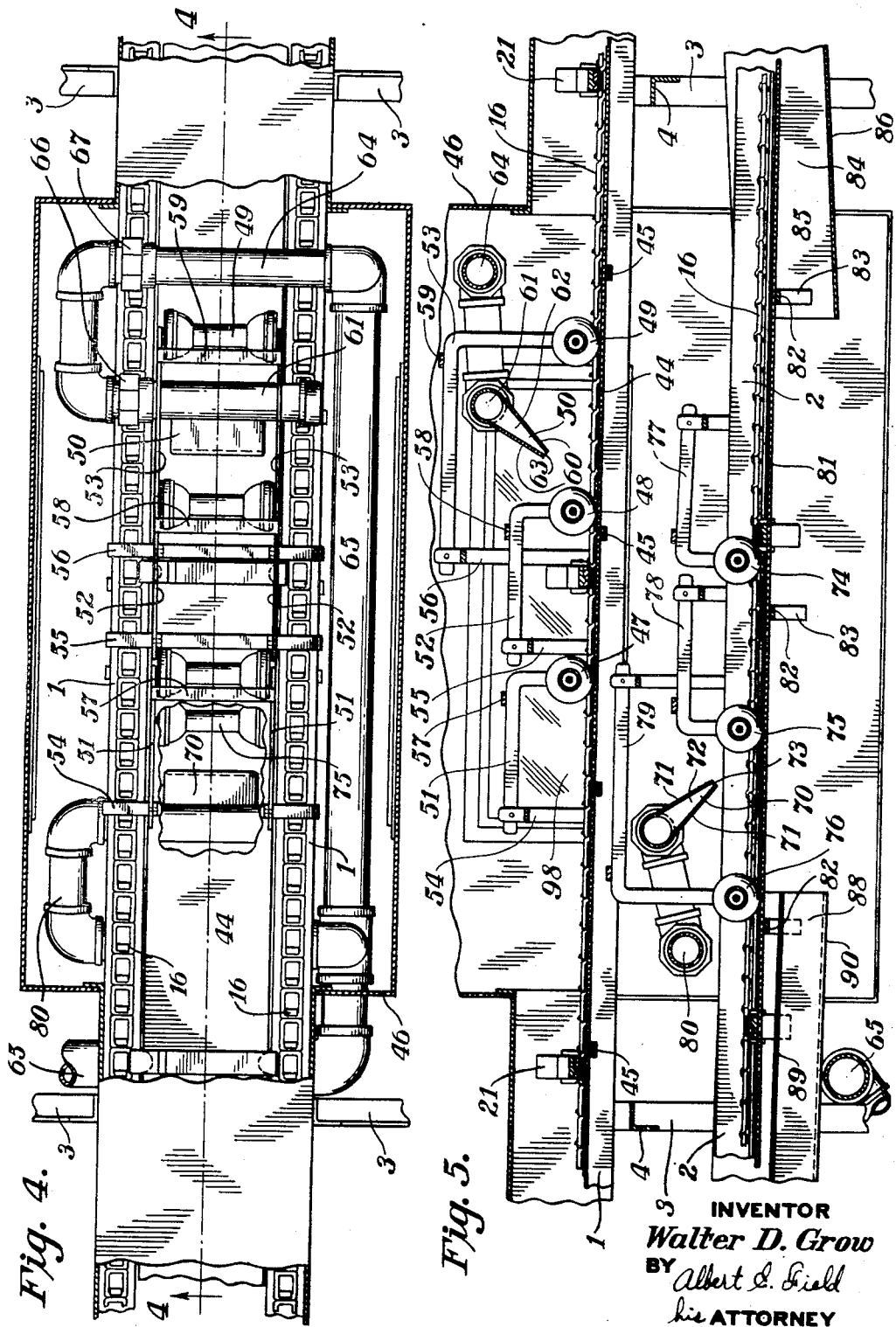

Sept. 12, 1939.  W. D. GROW  2,172,472

FISH-SCALING MACHINE

Filed Jan. 18, 1936  4 Sheets-Sheet 4

INVENTOR
Walter D. Grow
BY Albert E. Field
his ATTORNEY

Patented Sept. 12, 1939

2,172,472

UNITED STATES PATENT OFFICE 2,172,472

FISH-SCALING MACHINE

Walter D. Grow, Painesville, Ohio, assignor to Grow Bros., Painsville, Ohio, a partnership Application January 18, 1936, Serial No. 59,746

7 Claims. (Cl. 17—5)

This invention relates to means for scaling fish and has for its object apparatus for conveying the fish beneath nozzles, from which are emitted streams of fluid under pressure, in such a manner that the fish are completely scaled without the necessity of manually turning them over on the conveyor.

A second object of my invention is the provision of a novel conveyor belt for the fish, means for securing them thereon and means for releasing the securing means at proper points in the travel of the belt to permit the application and removal of the fish to and from said securing means.

A further object contemplates the use of an auxiliary or secondary conveyor belt at the loading end of the machine to facilitate application of the fish to the securing means carried by the main or primary conveyor belt.

Another object is the provision of nozzles adjustable both vertically and angularly to take care of different sizes of fish so as to obtain the most efficient performance at all times.

Other objects will be in part apparent and in part pointed out in the following detailed description of an embodiment of my invention as shown in the accompanying drawings in which:

Figure 2 is a view in plan of the left half of the machine shown in Figure 1 with a part of the hood broken away.

Figure 3 is a view in section taken on line 3—3 of Figure 2.

Figure 4 is a plan view of the right half of the machine shown in Figure 1 with the hood and a part of the upper floor broken away.

Figure 5 is a vertical sectional view taken on line 4—4 of Figure 4.

Figure 1:
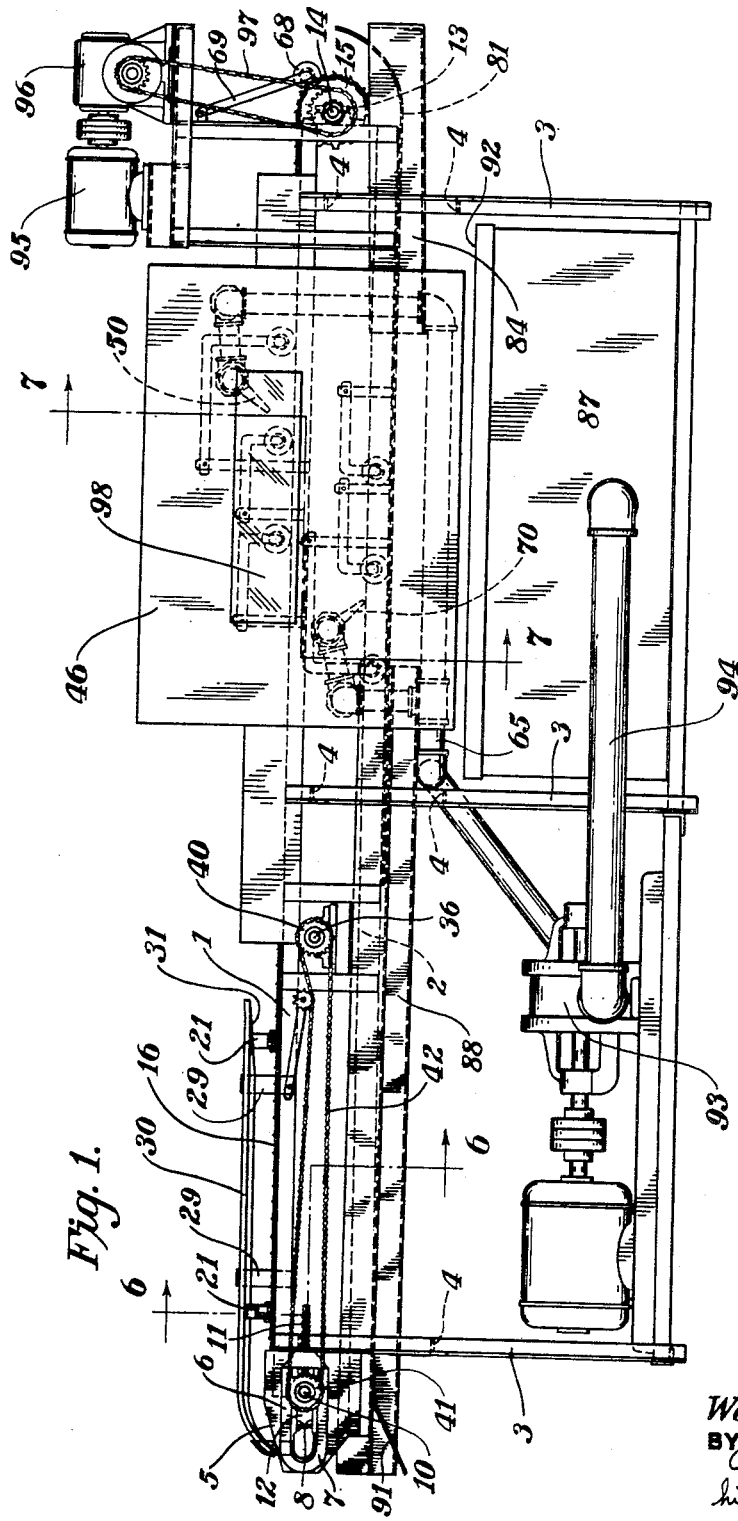
Figure 1 is a view in elevation of a fish scaling machine embodying my invention.

Referring to the drawings, my machine consists of a framework comprising a pair of upper longitudinal members 1, 1, lower longitudinal members 2, 2 and a plurality of legs 3, all shown as angle irons. Cross members 4 may be used to tie the frame together laterally. At the left or front end of the frame, as viewed in Figs. 1—3, are bearing support plates 5, 5 secured to members 1 and 2. Fastened to the plates 5, 5 are adjustable take-up bearings 6, 6 comprising bearing support members 7, 7 provided with guiding surfaces 8, 8 for receiving bearings 9, 9. The ends of sprocket shaft 10 are received in these bearings. Screw elements 11, 11 pass through threaded holes in the end of each support member 7 and engage the bearings 9, 9 for adjusting the latter longitudinally of the machine.

Mounted on the shaft 10 and spaced thereon so as to lie in the vertical plane of members 1 and 2, are sprockets 12, 12. At the right or rear end of the machine, as seen in Figure 1, a pair of bearings 13 fastened to the frame provide supports for a drive shaft 14. On this shaft are mounted drive sprockets 15 spaced an amount equal to that of the sprockets 12, 12 and lying in the same vertical plane therewith. Only one bearing 13 and sprocket 15 are shown, but it will be understood that there are one bearing and one sprocket at each side of the machine. Between the sprockets 12, 12 and 15, 15 are a pair of link or primary conveyor belts 16, 16 for conveying the fish to be scaled. As shown, each belt consists of a series of metal links, but it is apparent that forms of conveyor belts other than that illustrated may be employed if desired.

Spaced at intervals along the belts 16, 16 are links 17 having projections 18, to which are fastened the means for clamping the fish to the main conveyor belt. The clamping means may take the form of a base member 19 secured at each end to the projections 18, 18 of an opposite pair of links 14. The base members thus function to space and tie together the two primary conveyor belts laterally of the machine. Member 19 is provided with a pair of upstanding flanges 20, 20 for pivotal mounting of a bell-crank lever 21 comprising horizontal arms 22 and 23 and a connecting vertical portion 24. A pin 25 passes through openings in flanges 20, 20 and lever 21 to form a pivot for the lever. Extending between member 19 and arm 23 of lever 21 is a spring 26 which normally maintains arm 22 in contact with member 19. The arm 22 of lever 21 may be provided with a projection 27, and member 19 with a corresponding recess 28 for securely clamping the tail of a fish under pressure of the spring 26.

To simplify application to and removal of the fish from the clamping means, camming mechanism is provided to operate the levers 21 as they pass along the front or receiving portion of the machine. Members 29 are secured to the frame of the machine and support a cam track 30. As the conveyor belt moves from left to right, as viewed in Figs. 1—3, the arms 23 of the bell-crank levers 21 sucessively engage the under side of the cam track 30 and, due to its camming action, the levers are rotated about their pivots, permitting application of the tail of the fish beneath the raised arm 22. The cam track 30 is sloped upward at the end of the loading station, as at 31, which permits release of the bell-crank levers, and the action of spring 26 causes the arms 22 to firmly clamp the fish to the conveyor belt.

The clamping means above described support only one end of the fish and I find it desirable to provide a further support that will move at the same speed as the main conveyor belt for that portion of the travel necessary for the clamping means to pass the cam track 30. An auxiliary or secondary conveyor belt 32 comprising a series of metal links 33 is supported at one end by a sprocket wheel 34 mounted on shaft 10. These links 33 are formed with relatively wide wings or supporting surfaces on which the fish are adapted to rest during the clamping operation. A sprocket wheel 35 on shaft 36 supports the other end of this belt. The shaft 36 rotates in bearings 37 mounted on horizontal members 38, which members are in turn supported by vertical elements 39 secured to the frame of the machine. The shaft 36 has one end thereof extending outside of the machine on which is mounted a sprocket wheel 40. Shaft 10 is provided with a similar sprocket 41 and the sprockets 40 and 41 are connected by a roller drive chain 42. It will be seen that as the upper portions of the conveyor belts 16 move from left to right, shaft 10 is rotated, moving the sprocket 41 with it. Roller chain 42 in turn, moved by sprocket 41, causes sprocket 40, shaft 36 and sprocket 35 to rotate in the same direction, thus moving the auxiliary conveyor belt 32 in the same direction as the main conveyor belt 16. It will be understood that the sizes of sprockets 40 and 41 may be such that the conveyor belts 16 and 32 move at the same speed. Longitudinally extending plates 43, 43 may be secured to members 1, 1 to support the wings of the links 33 and maintain said links at the same level.

With the above described construction there is provided a movable support for the fish, traveling at the same speed as the main conveyor belts 16 and adapted to move the fish with these belts until the clamping means grip the fish between the members 19 and 21. After leaving the auxiliary conveyor belt 32 the fish may be supported by a table 44 secured to the frame by cross members 45.

Figure 6:
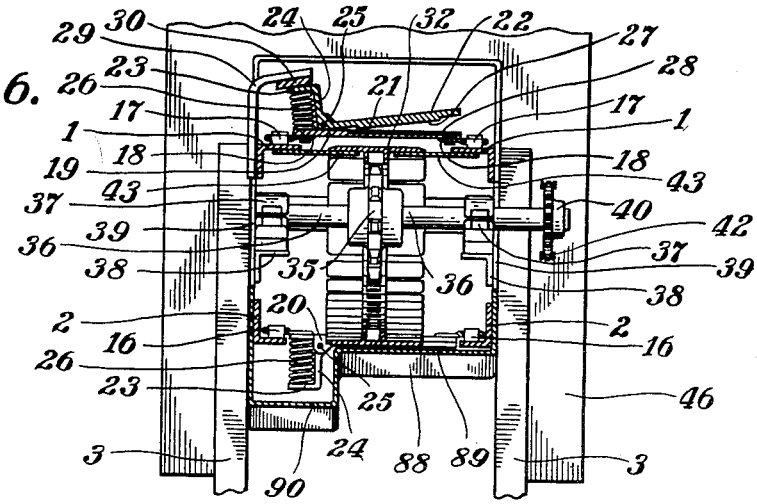
Figure 6 is a view in section taken on line 6—6 of Figure 1.

Referring particularly to Figs. 4—6, there is shown the scaling portion of the machine, which may be enclosed by a sheet metal chamber or box 46. The fish are drawn into this chamber on the conveyor belts 16 and are held from lateral movement by rollers 47, 48 and 49 while they pass beneath a nozzle 50. These rollers are mounted on shafts respectively supported by pivotally mounted pairs of arms 51, 51, 52, 52 and 53, 53. These arms are pivotally mounted on inverted U-shaped members 54, 55 and 56 secured to the frame of the machine. The roller arms 51, 51, 52, 52 and 53, 53 may also be joined at their forward ends by braces 57, 58 and 59.

The nozzle 50 may comprise a pair of sheets 60, 60 welded into a length of pipe 61 into which an opening has first been cut. The sheets 60 may be joined at each side by other sheets 62, leaving a narrow opening 63 at the end. The nozzle is connected by a pipe 64 to a main pipe 65 for supplying a fluid, such as water, under pressure to the nozzle. As the fish are drawn beneath the nozzle the pressure of the water or other fluid washes or blows the scales off the fish. The rollers 47, 48 and 49 may be made of metal and should be of such weight as to maintain the fish in the center of the machine laterally thereof, and prevent them from being blown around by the pressure of the fluid from the nozzle. Without such centering means the fish would be forced from beneath the nozzle to one side or the other thereof by the stream of fluid from such nozzle, and no scaling action would result. It will be noted that the rollers are of smaller diameter in their central portions so as to more nearly conform to the contour of the fish.

The nozzles may be made adjustable both vertically and angularly by the use of pivotal joints 66, 67. These may be in the form of ordinary pipe unions. It is at times necessary to adjust the nozzles according to the various sizes of fish being scaled in order that the best scaling efficiency may be obtained.

After passing under nozzle 50 the fish are carried around sprockets 15 and into the lower portion of chamber 46. To guide the fish around sprocket 15 I provide a roller 68 supported by arms 69, 69 pivotally mounted on the frame. It will be seen that the passage beneath nozzle 50 scales only one side of the fish. In passing around sprocket 15 they are turned upside down, and I provide a similar nozzle 70 in the lower part of the chamber to scale the other side.

Figure 7:
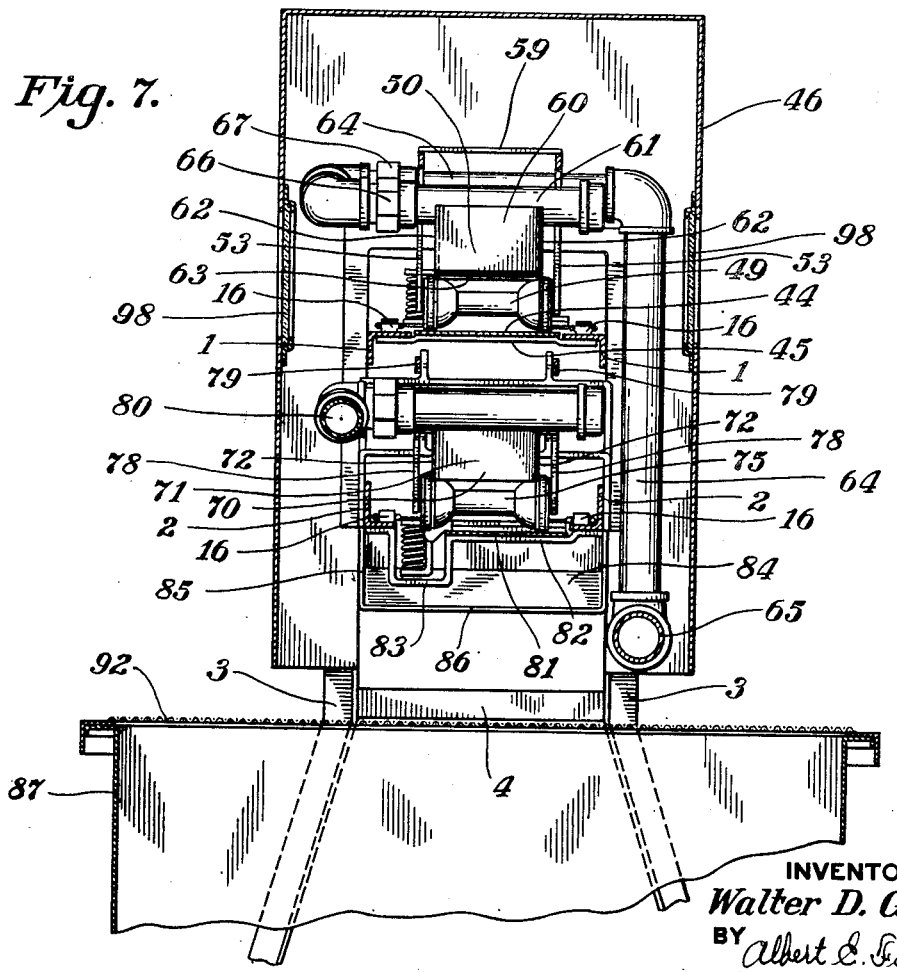
Figure 7 is a view in section taken on line 7—7 of Figure 1.

This nozzle is made the same as nozzle 50 and comprises sloping sheets 71, 71, side walls 72, 72 and opening 73. Rollers 74, 75 and 76 hold the fish in position in the same manner as rollers 47, 48 and 49. Pivoted arms 77, 78 and 79 support rollers 74, 75 and 76 similar to those described for the other rollers. Nozzle 70 is supplied with fluid through a pipe 80 connected into the main line 65. A lower table in the form of a sheet 81 may be fastened to members 2, 2 by means of cross-members 82, to support the fish as they pass beneath the lower nozzle and are returned to the unloading end of the machine. Members 82 are formed with a U-shaped portion 83 to provide for passage of the downwardly extending part of the clamping means. It will be apparent that a considerable amount of water will be used in the operation of my machine, and I have therefore provided means for using the same water over and over again. In Figs. 5 and 7 there is shown a rear trough 84 comprising side walls 85, 85 and a connecting bottom wall 86. This trough slopes toward the center of the machine and collects water from the nozzles and returns it to a reservoir 87, which may be a sheet metal box. A trough 88 extending from the front of the machine also slopes toward the reservoir, and may be in the form of a table portion 89, which acts to support the fish after they leave table 81, and an offset portion 90 providing clearance for the downwardly extending part of the clamping means. This trough may also be secured to members 2, 2. At the front end of the machine, trough 88 may be bent downwardly as at 91 so that the scaled fish may slide into a receptacle placed therebelow to receive them.

A removable screen 92 may be placed over the top of the reservoir 87 to prevent passage of the fish scales thereinto. A motor driven pump 93 takes the water from the reservoir through pipe 94 and forces it into the main supply pipe 65 at the desired pressure, which may vary from about 30 to 60 pounds per square inch, depending on the type and size of fish being scaled.

The main and auxiliary conveyor belts 16 and 32 may be driven by a motor 95 through a speed reducing mechanism 96 and chain 97 connected with sprocket shaft 14. The speed of the conveyor belts may vary from about 30 to 60 feet per minute. If desired, windows 98 may be provided in the box 46 so that the scaling of the fish may be observed.

In operation the pump and chain drive are first started, after which the fish are successively placed on the auxiliary belt 32 with their tails in the direction of travel and in position to be secured by the clamping means. Since the auxiliary conveyor belt 32 travels at the same rate of speed as the main conveyor belt 16 carrying the clamping means, the fish are conveyed by said auxiliary belt in fixed relation to said clamping means, so that when the latter passes out from under the cam track 30, the fish will be readily secured by such clamping means. The fish are then carried beneath nozzle 50 and one side is scaled. The main conveyor belt 16 then moves them to the lower table beneath nozzle 70, which scales the other side. The fish are then returned to the front end of the machine, and, as the portion 23 of the bell-crank lever contacts the cam track 30, the fish are released and slide down the sloping member 91 into a receptacle.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a fish scaling machine a conveyor belt for moving the fish through the machine comprising a pair of spaced flexible members, means connecting said members, clamping means on said connecting means, and a nozzle adjacent said conveyor adapted to emit a fluid under pressure to remove scales from the fish, one or more means being provided above a run of the conveyor in floating relation thereto to contact a fish thereon to tend to guide the fish in a single direction of movement while the fish is passing beneath the nozzle to substantially avoid lateral movement thereof.

2. In a fish scaling machine a conveyor belt comprising a pair of spaced flexible members adapted to convey fish through the machine, fish gripping means extending between said members and a second conveyor belt intermediate said members.

3. In a fish scaling machine, conveying means for moving the fish through the machine, means comprising a pair of nozzles emitting a thin stream of fluid under pressure and substantially the width of the fish, said nozzles being placed at different levels in operative relation to said belt for removing scales from the fish and lateral movement restraining means for substantially prevening lateral movement of the fish as it passs beneath the nozzles.

4. In a fish scaling machine, means for conveying fish through the machine, a nozzle for directing a fluid under pressure against the fish to be scaled to remove scales therefrom, adjustable means associated with said nozzle for changing the position thereof relative to said conveying means, and floating means engaging the surface of a fish moved by said conveying means, said nozzle having the opening at the end thereof as wide as said floating means.

5. In a fish scaling machine, means for conveying fish through the machine, a nozzle for directing a fluid under pressure against the fish to be scaled to remove scales therefrom, adjustable means associated with said nozzle for changing the position thereof angularly with respect to said conveying means and vertically movable fish engaging means adapted to retard lateral movement of a fish conveyed beneath the nozzle, said adjustable means directing the fluid toward said engaging means in various adjustments of said nozzle.

6. In a fish scaling machine, means for conveying fish through the machine, a nozzle for directing a fluid under pressure against the fish to be scaled to remove scales therefrom, adjustable means associated with said nozzle for changing the position thereof vertically and angularly relative to said conveying means, and means associated with the nozzle tending to counteract any movement in a lateral direction of the fish which may be caused by the fluid emitted from the nozzle, said means contacting points at different elevations in the contacting surface of the fish.

7. In a fish scaling machine, a conveyor belt for moving the fish through the machine comprising a pair of spaced flexible members, means connecting said members, clamping means on said connecting means, a nozzle adjacent said conveyor adapted to emit a fluid under pressure to remove scales from the fish and pivoted means adapted to contact the upper surface of a fish while conveyed below the nozzle, said pivoted means having substantially the same width as the spray emitted from the nozzle, whereby the tendency of the spray to cause lateral movement of the fish will be counteracted by the tendency of the pivoted means to prevent lateral movement.

WALTER D. GROW.